(12) United States Patent
Fu et al.

(10) Patent No.: US 10,154,533 B2
(45) Date of Patent: Dec. 11, 2018

(54) DATA PACKET PROCESSING METHOD AND DEVICE

(71) Applicant: China Academy of Telecommunications Technology, Beijing (CN)

(72) Inventors: Zhe Fu, Beijing (CN); Dajun Zhang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 15/127,722

(22) PCT Filed: Mar. 4, 2015

(86) PCT No.: PCT/CN2015/073607
§ 371 (c)(1),
(2) Date: Sep. 21, 2016

(87) PCT Pub. No.: WO2015/139556
PCT Pub. Date: Sep. 24, 2015

(65) Prior Publication Data
US 2017/0142770 A1    May 18, 2017

(30) Foreign Application Priority Data

Mar. 21, 2014 (CN) .......................... 2014 1 0108641

(51) Int. Cl.
*H04W 76/15*    (2018.01)
*H04L 1/16*    (2006.01)
(Continued)

(52) U.S. Cl.
CPC ........... *H04W 76/15* (2018.02); *H04L 1/1614* (2013.01); *H04L 69/22* (2013.01); *H04W 84/045* (2013.01)

(58) Field of Classification Search
CPC . H04W 76/15; H04W 76/025; H04W 84/045; H04L 69/22; H04L 1/1614
(Continued)

(56) References Cited

U.S. PATENT DOCUMENTS

2012/0120920 A1    5/2012    Zhang et al.
2013/0088960 A1*   4/2013    Bi .................. H04L 1/1841
                                                      370/235
(Continued)

FOREIGN PATENT DOCUMENTS

CN    102833802    12/2012
CN    103546928 A    1/2014
(Continued)

OTHER PUBLICATIONS

R2-140115: ZTE Corporation, "Discussion on PDCP reordering issue for small cell", TSG-RAN2 Meeting #85, Prague, Czech, Jan. 10-14, 2014. (6 pages).
(Continued)

*Primary Examiner* — Obaidul Huq
(74) *Attorney, Agent, or Firm* — Foley & Lardner LLP

(57) ABSTRACT

Provided are a data packet processing method and device, which are used for solving the problem of how to process a PDCP SDU data packet of a split bearer in the process of normally transmitting the PDCP SDU data packets of the split bearer based on a bearer splitting scenario and when an auxiliary eNB providing a service for the split bearer changes, thereby increasing the working efficiency of aggregating eNBs and the utilization rate of resources. The method of the present application comprises: determining transmission information about each packet data convergence protocol (PDCP) service data unit (SDU) data packet of a bearer in a bearer splitting scenario which is being
(Continued)

transmitted; and processing the data packet according to the transmission information about each data packet.

18 Claims, 4 Drawing Sheets

(51) Int. Cl.
    *H04L 29/06*     (2006.01)
    *H04W 84/04*     (2009.01)
(58) Field of Classification Search
    USPC .................................................. 370/310, 328
    See application file for complete search history.

(56) References Cited

U.S. PATENT DOCUMENTS

| | | | |
|---|---|---|---|
| 2013/0170474 A1 | 7/2013 | Bi et al. | |
| 2015/0085800 A1* | 3/2015 | Sivanesan | H04W 76/38<br>370/329 |
| 2016/0338130 A1* | 11/2016 | Park | H04W 76/025 |

FOREIGN PATENT DOCUMENTS

| | | |
|---|---|---|
| CN | 103888222 | 6/2014 |
| EP | 3 104 632 A1 | 12/2016 |

OTHER PUBLICATIONS

International Search Report for PCT/CN2015/073607 dated Jun. 12, 2012.

* cited by examiner

… (1)

DATA PACKET PROCESSING METHOD AND DEVICE

This application is a US National Stage of International Application No. PCT/CN2015/073607, filed on Mar. 4, 2015, designating the United States, and claiming the benefit of Chinese Patent Application No. 201410108641.9, filed with the Chinese Patent Office on Mar. 21, 2014 and entitled "Method and apparatus for processing a data packet", which is hereby incorporated by reference in its entirety.

FIELD

The present application relates to the field of communications, and particularly to a method and apparatus for processing a data packet.

BACKGROUND

As smart terminals are developing rapidly, and there are constantly growing demands of subscribers for a transmission rates and a capacity of data services, traditional networks with a single layer of coverage by a macro eNB have failed to satisfy the demands of their subscribers for the data services; and at present, the network scenarios where layered networks are deployed have been introduced by the 3$^{rd}$ Generation Partnership Project (3GPP) to address this problem, and also the bearer splitting technologies and architecture have been introduced so that terminals can access cell resources of multiple eNBs concurrently to thereby enhance mobility management on the terminals, and improve a peak rate for the transmission rate of the data services of the terminals.

At present, a data packet for a split bearer is typically processed in such a way that a data packet discard timer is started for a Packet Data Convergence Protocol (PDCP) Service Data Unit (SDU), and the PDCP SDU data packet for the split bearer is discarded according to the discard timer, that is, the PDCP entity starts a discard timer for a PDCP SDU for each split bearer upon reception of the PDCP SDU, and if the discard timer exceeds a preset length of time, then the PDCP SDU data packet for the split bearer corresponding to the discard timer is discarded; and a preset length of time of a discard timer preset for a PDCP SDU for a different split bearer (the PDCP SDU is allocated for transmission on a Master base station (MeNB) or a Secondary base station (SeNB)) is different due to a delay via an X2 interface between aggregated base stations.

With the network scenario of layered network deployment, and the bearer splitting technologies and architecture, the same split bearer of a User Equipment (UE) is mapped onto logical channels of multiple aggregated base stations for transmission, where the aggregated base stations include a master base station and secondary base stations; and the split bearer is transmitted by the multiple aggregated base stations sharing a PDCP entity located in the master base station, and UE RLC entities for the different aggregated base stations need to be configured separately. While the split bearer is being transmitted, the aggregated base stations notify the UE of PDCP Protocol Data Units (PDUs) of the split bearer, and in the meantime, the PDCP entity located in the master base station stores the PDCP PDUs or the PDCP SDUs notified to the secondary base stations. If there is a change in the secondary base stations serving the same split bearer, where the change in the secondary base stations includes an increase or decrease in the number of secondary base stations, a change of secondary base station, and reconfiguration of some secondary base station, but there is no change in the master base station of the split bearer, then there will be a change in the transmission architectures of the bearer at the UE and network sides, but the behaviors at the UE and network sides in the existing procedure of changing a cell in carrier aggregation have failed to address processing of a PDCP SDU data packet for a split bearer in the scenario of bearer splitting, particularly reporting of a transmission state of the PDCP SDU data packet for the split bearer, processing of the PDCP SDU data packet, transmission of an end indication, etc.

In summary, in the network scenario of layered network deployment, and the hearer splitting technologies and architecture in the prior art, there has been absent so far a corresponding solution to processing of a PDCP SDU data packet for a split bearer if there is a change in the secondary base stations serving the same split bearer.

SUMMARY

The application provides a method and apparatus for processing a data packet so as to address the problem of how to process a PDCP SDU data packet for a split bearer in the scenario of bearer splitting while the split bearer is being transmitted normally, and when there is a change in secondary base stations serving the split bearer, to thereby improve the operating efficiency of the aggregated base stations, and the utilization ratio of resources.

An embodiment of the application provides a method for processing a data packet, the method including:

determining transmission information of each Packet Data Convergence Protocol (PDCP) Service Data Unit (SDU) data packet of a bearer being transmitted in a scenario of bearer splitting; and processing each data packet according to the transmission information of that data packet.

As can be apparent from the method above, in the application, the transmission information of each PDCP SDU data packet of the hearer being transmitted in the scenario of bearer splitting is determined, and the data packet corresponding to the transmission information of the data packet is processed according to the transmission information of the data packet so as to address the problem of how to process a PDCP SDU data packet for a split bearer in the scenario of bearer splitting while the split bearer is being transmitted normally, and when there is a change in secondary base stations serving the split bearer, to thereby improve the operating efficiency of the aggregated base stations, and the utilization ratio of resources.

Preferably determining the transmission information of each Packet Data Convergence Protocol (PDCP) Service Data Unit (SDU) data packet of the bearer being transmitted in the scenario of bearer splitting includes:

receiving data packet transmission condition indication information of a PDCP Protocol Data Unit (PDU) transmitted by a Radio Link Control (RLC) entity, wherein the data packet transmission condition indication information includes the transmission information of each PDCP SDU data packet of the bearer being transmitted, wherein the transmission information of the data packet includes one or combination of information indicating a transmission failure of the data packet, information indicating a transmission success of the data packet, and information indicating that the data packet has not been transmitted; and determining the transmission information of each PDCP SDU data packet of the bearer being transmitted, according to the data packet transmission condition indication information.

In this way, the transmission information of each PDCP SDU data packet of the bearer being transmitted can be determined according to the data packet transmission condition indication information of the PDCP PDU transmitted by the RLC entity, and further the data packet corresponding to the transmission information of the data packet can be processed according to the transmission information of the data packet.

Preferably if there is an increase in the number of secondary base stations serving the bearer being transmitted on a master base station, then transmission of the PDCP SDU data packets of the bearer will be kept in the scenario of bearer splitting.

In this way, if there is an increase in the number of secondary base stations serving the bearer being transmitted on the master base station, then the application will provide a corresponding solution to processing of the PDCP SDU data packets of the split bearer.

Preferably if there is a decrease in the number of secondary base stations serving the bearer in the scenario of bearer splitting, and/or reconfiguration of secondary base station, and/or a change of secondary base station, then before the transmission information of each Packet Data Convergence Protocol (PDCP) Service Data Unit (SDU) data packet of the bearer being transmitted in the scenario of bearer splitting is determined, the method further includes:

stopping the PDCP SDU data packets of the split bearer from being transmitted; and keeping or stopping transmission of PDCP SDU data packets of other bearers.

In this way, if there is a decrease in the number of secondary base stations serving the bearer in the scenario of bearer splitting, and/or reconfiguration of secondary base station, and/or a change of secondary base station, then the application will provide a corresponding solution to processing of the PDCP SDU data packets of the split bearer.

Preferably if a secondary base station serving the bearer in the scenario of bearer splitting is changed, then receiving the data packet transmission condition indication information of the PDCP PDU transmitted by the RLC entity of a UE includes:

receiving the data packet transmission condition indication information of the PDCP PDU, transmitted by a PDCP entity from a UE, forwarded by a changed target secondary base station serving the bearer.

In this way, if some secondary base station serving the bearer in the scenario of bearer splitting is changed, then the data packet transmission condition indication information of the PDCP PDU, transmitted by the PDCP entity from the UE, forwarded by the changed target secondary base station serving the bearer will be received to thereby further determine the transmission information of each PDCP SDU data packet.

Preferably if there is a decrease in the number of secondary base stations serving the bearer in the scenario of bearer splitting, and/or reconfiguration of secondary base station, and/or a change of secondary base station, then determining the transmission information of each PDCP SDU data packet of the bearer being transmitted in the scenario of bearer splitting includes:

receiving data packet transmission condition indication information of a PDCP Protocol Data Unit (PDU) transmitted by secondary base stations serving the bearer, wherein the data packet transmission condition indication information includes the transmission information of each PDCP SDU data packet of the bearer being transmitted, wherein the transmission information of the data packet includes one or combination of information indicating a transmission failure of the data packet, information indicating a transmission success of the data packet, and information indicating that the data packet has not been transmitted; and determining the transmission information of each PDCP SDU data packet of the bearer being transmitted, according to the data packet transmission condition indication information.

In this way, if there is a decrease in the number of secondary base stations serving the bearer in the scenario of bearer splitting, and/or reconfiguration of secondary base station, and/or a change of secondary base station, then the data packet transmission condition indication information of the PDCP PDU transmitted by the secondary base stations serving the bearer will be received to thereby determine the transmission information of each PDCP SDU data packet so that the data packet corresponding to the transmission information of the data packet can be processed according to the transmission information of the data packet.

Preferably after the data packet transmission condition indication information of the PDCP PDU transmitted by the secondary base stations serving the bearer is received, the method further includes:

transmitting end indication information to the secondary base stations serving the bearer to indicate the last data packet among the PDCP SDU data packets.

In this way, the secondary base stations serving the split bearer can be notified of the last data packet among the PDCP SDU data packets.

Preferably determining the transmission information of each PDCP SDU data packet of the bearer being transmitted in the scenario of bearer splitting includes:

determining the transmission information of each PDCP SDU data packet of the bearer being transmitted in the scenario of bearer splitting according to a data packet discard timer and/or the received data packet transmission condition indication information.

In this way, the transmission information of each PDCP SDU data packet can be determined according to the data packet discard timer and/or the received data packet transmission condition indication information so that the data packet corresponding to the transmission information of the data packet can be processed according to the transmission information of the data packet while improving the operating efficiency of the aggregated base stations, and the utilization ratio of resources.

Preferably the data packet transmission condition indication information is in the form of an information stream, or in the form of data transmission acknowledgement state packets;

the data packet transmission condition indication information in the form of an information stream includes sequence numbers and transmission information of all the data packets including the first data packet which has failed to be transmitted or has not been transmitted, up to the lastly transmitted data packet, or the lastly transmitted data packet with an acknowledged transmission state among the PDCP SDU data packets of the bearer being transmitted, or sequence numbers and transmission information of all the data packets with acknowledged transmission states among the PDCP SDU data packets, and end indication information to indicate the last data packet in current transmission of the data packets; and the data packet transmission condition indication information in the form of data transmission acknowledgement state packets includes sequence numbers and transmission information of all the data packets including the first data packet which has failed to be transmitted or has not been transmitted, up to the lastly transmitted data packet, or the lastly transmitted data packet with an acknowledged transmission state among the PDCP SDU data packets of the bearer being transmitted;

wherein the data packet with the acknowledged transmission state includes one or combination of a data packet which has not been transmitted, a data packet which has failed to be transmitted, and a data packet which has been transmitted successfully.

In this way, the transmission information of each PDCP SDU data packet can be determined according to the received data packet transmission condition indication information.

Preferably the transmission information of the data packet includes one or combination of information indicating a transmission failure of the data packet, information indicating a transmission success of the data packet, and information indicating that the data packet has not been transmitted; and processing each data packet according to the transmission information of the data packet includes:

discarding a data packet which has been transmitted successfully among the PDCP SDU data packets being transmitted;

retransmitting a data packet which has failed to be transmitted among the PDCP SDU data packets being transmitted; and transmitting a data packet which has not been transmitted among the PDCP SDU data packets being transmitted.

In this way, each data packet can be processed according to the transmission information of the data packet.

Preferably if there is a decrease in the number of secondary base stations serving the bearer in the scenario of bearer splitting, and/or reconfiguration of secondary base station, and/or a change of secondary base station, then the method further includes:

transmitting data packet transmission condition indication information of a PDCP Protocol Data Unit (PDU) to a peer entity for the peer entity to process the data packets, wherein the data packet transmission condition indication information includes the transmission information of each PDCP SDU data packet of the bearer being transmitted, wherein the transmission information of the data packet includes one or combination of information indicating a transmission failure of the data packet, information indicating a transmission success of the data packet, and information indicating that the data packet has not been transmitted.

In this way, the data packets can be processed by the peer entity according to the data packet transmission condition indication information.

An embodiment of the application provides an apparatus for processing a data packet, the apparatus including:

a transmission information determining unit configured to determine transmission information of each Packet Data Convergence Protocol (PDCP) Service Data Unit (SDU) data packet of a bearer being transmitted in a scenario of bearer splitting; and a data packet processing unit configured to process each data packet according to the transmission information of the data packet.

Preferably the transmission information determining unit is configured:

to receive data packet transmission condition indication information of a PDCP Protocol Data Unit (PDU) transmitted by a Radio Link Control (RLC) entity, wherein the data packet transmission condition indication information includes the transmission information of each PDCP SDU data packet of the bearer being transmitted, wherein the transmission information of the data packet includes one or combination of information indicating a transmission failure of the data packet, information indicating a transmission success of the data packet, and information indicating that the data packet has not been transmitted; and to determine the transmission information of each PDCP SDU data packet of the bearer being transmitted, according to the data packet transmission condition indication information.

In this way, the transmission information of each PDCP SDU data packet of the bearer being transmitted can be determined according to the data packet transmission condition indication information of the PDCP PDU transmitted by the RLC entity, and further the data packet corresponding to the transmission information of the data packet can be processed according to the transmission information of the data packet.

Preferably if there is an increase in the number of secondary base stations serving the bearer being transmitted on a master base station, then transmission of the PDCP SDU data packets of the bearer will be kept in the scenario of bearer splitting.

In this way, if there is an increase in the number of secondary base stations serving the bearer being transmitted on the master base station, then the application will provide a corresponding solution to processing of the PDCP SDU data packets of the split bearer.

Preferably if there is a decrease in the number of secondary base stations serving the bearer in the scenario of bearer splitting, and/or reconfiguration of secondary base station, and/or a change of secondary base station, then the transmission information determining unit is further configured:

to stop the PDCP SDU data packets of the split bearer from being transmitted; and to keep or stop transmission of PDCP SDU data packets of other bearers.

In this way, if there is a decrease in the number of secondary base stations serving the bearer in the scenario of bearer splitting, and/or reconfiguration of secondary base station, and/or a change of secondary base station, then the application will provide a corresponding solution to processing of the PDCP SDU data packets of the split bearer.

Preferably if a secondary base station serving the bearer in the scenario of bearer splitting is changed, then the transmission information determining unit is further configured:

to receive the data packet transmission condition indication information of the PDCP PDU, transmitted by a PDCP entity from a UE, forwarded by a changed target secondary base station serving the bearer.

In this way, if some secondary base station serving the bearer in the scenario of bearer splitting is changed, then the data packet transmission condition indication information of the PDCP PDU, transmitted by the PDCP entity from the UE, forwarded by the changed target secondary base station serving the bearer will be received to thereby further determine the transmission information of each PDCP SDU data packet.

Preferably if there is a decrease in the number of secondary base stations serving the bearer in the scenario of bearer splitting, and/or reconfiguration of secondary base station, and/or a change of secondary base station, then the transmission information determining unit is further configured:

to receive data packet transmission condition indication information of a PDCP Protocol Data Unit (PDU) transmitted by secondary base stations serving the bearer, wherein the data packet transmission condition indication information includes the transmission information of each PDCP SDU data packet of the bearer being transmitted, wherein the transmission information of the data packet includes one or combination of information indicating a transmission failure of the data packet, information indicating a transmission success of the data packet, and information indicating that the data packet has not been transmitted; and to determine the transmission information of each PDCP SDU data packet of the bearer being transmitted, according to the data packet transmission condition indication information.

In this way, if there is a decrease in the number of secondary base stations serving the bearer in the scenario of bearer splitting, and/or reconfiguration of secondary base station, and/or a change of secondary base station, then the data packet transmission condition indication information of the PDCP PDU transmitted by the secondary base stations serving the bearer will be received to thereby determine the transmission information of each PDCP SDU data packet so that the data packet corresponding to the transmission information of the data packet can be processed according to the transmission information of the data packet.

Preferably the transmission information determining unit is further configured, after the data packet transmission condition indication information of the PDCP PDU transmitted by the secondary base stations serving the bearer is received:

to transmit end indication information to the secondary base stations serving the bearer to indicate the last data packet among the PDCP SDU data packets.

In this way, the secondary base stations serving the split bearer can be notified of the last data packet among the PDCP SDU data packets.

Preferably the transmission information determining unit is further configured:

to determine the transmission information of each PDCP SDU data packet of the bearer being transmitted in the scenario of bearer splitting according to a data packet discard timer and/or the received data packet transmission condition indication information.

In this way, the transmission information of each PDCP SDU data packet can be determined according to the data packet discard timer and/or the received data packet transmission condition indication information so that the data packet corresponding to the transmission information of the data packet can be processed according to the transmission information of the data packet while improving the operating efficiency of the aggregated base stations, and the utilization ratio of resources.

Preferably the data packet transmission condition indication information is in the form of an information stream, or in the form of data transmission acknowledgement state packets;

the data packet transmission condition indication information in the form of an information stream includes sequence numbers and transmission information of all the data packets including the first data packet which has failed to be transmitted or has not been transmitted, up to the lastly transmitted data packet, or the lastly transmitted data packet with an acknowledged transmission state among the PDCP SDU data packets of the bearer being transmitted, or sequence numbers and transmission information of all the data packets with acknowledged transmission states among the PDCP SDU data packets, and end indication information to indicate the last data packet in current transmission of the data packets; and the data packet transmission condition indication information in the form of data transmission acknowledgement state packets includes sequence numbers and transmission information of all the data packets including the first data packet which has failed to be transmitted or has not been transmitted, up to the lastly transmitted data packet, or the lastly transmitted data packet with an acknowledged transmission state among the PDCP SDU data packets of the bearer being transmitted;

wherein the data packet with the acknowledged transmission state includes one or combination of a data packet which has not been transmitted, a data packet which has failed to be transmitted, and a data packet which has been transmitted successfully.

In this way, the transmission information of each PDCP SDU data packet can be determined according to the received data packet transmission condition indication information.

Preferably the transmission information of the data packet includes one or combination of information indicating a transmission failure of the data packet, information indicating a transmission success of the data packet, and information indicating that the data packet has not been transmitted; and the data packet processing unit is configured:

to discard a data packet which has been transmitted successfully among the PDCP SDU data packets being transmitted;

to retransmit a data packet which has failed to be transmitted among the PDCP SDU data packets being transmitted; and to transmit a data packet which has not been transmitted among the PDCP SDU data packets being transmitted.

In this way, each data packet can be processed according to the transmission information of the data packet.

Preferably if there is a decrease in the number of secondary base stations serving the bearer in the scenario of bearer splitting, and/or reconfiguration of secondary base station, and/or a change of secondary base station, then the apparatus further includes:

a transmission information transmitting unit configured to transmit data packet transmission condition indication information of a PDCP Protocol Data Unit (PDU) to a peer entity for the peer entity to process the data packets, wherein the data packet transmission condition indication information includes the transmission information of each PDCP SDU data packet of the bearer being transmitted, wherein the transmission information of the data packet includes one or combination of information indicating a transmission failure of the data packet, information indicating a transmission success of the data packet, and information indicating that the data packet has not been transmitted.

In this way, the data packets can be processed by the peer entity according to the data packet transmission condition indication information.

DETAILED DESCRIPTION OF THE EMBODIMENTS

The application provides a method and apparatus for processing a data packet so as to address processing of a PDCP SDU data packet for a split bearer in the scenario of bearer splitting while the split bearer is in normal operation, and when there is a change in secondary base stations serving the split bearer, to thereby improve the operating efficiency of the aggregated base stations, and the utilization ratio of resources.

A method and apparatus for processing a data packet according to the application is based on the network scenario of layered network deployment, and the bearer splitting technologies and architecture; and the method and apparatus according to the application can be applicable to the architecture supporting both uplink and downlink bearer splitting, and the architecture supporting only downlink bearer splitting.

In the network scenario of layered network deployment illustrated in FIG. 1, a macro eNB (referred hereinafter to as a master base station) provides underlying network coverage, and some low-power local nodes (small cells/secondary eNBs, referred hereinafter to as secondary base stations) are deployed in a hotspot area, an indoor environment at home, an office environment, and other small coverage areas to provide small-area hotspot coverage in the networks, where there are data interfaces or signaling interfaces between the secondary base stations and the master base station, so that UEs can either operate in the network covered by the master base station, or operate in the networks covered by the secondary base stations. Since there are small coverage areas controlled by the secondary base stations, and smaller numbers of UEs being served in the coverage areas, a UE connected with a secondary base station tends to be provided with a higher quality of service, e.g., a higher transmission rate of service data, a link with a higher quality, etc. Thus if a UE connected with the master base station enters a coverage area of a cell corresponding to a secondary base station, then the UE can be transferred to the secondary base station to be provided with a network service available from the secondary base station; and if the UE moves away from the coverage area of the cell corresponding to the secondary base station, then the UE will be transferred to a cell controlled by the master base station to keep wirelessly connected.

Figure 1:
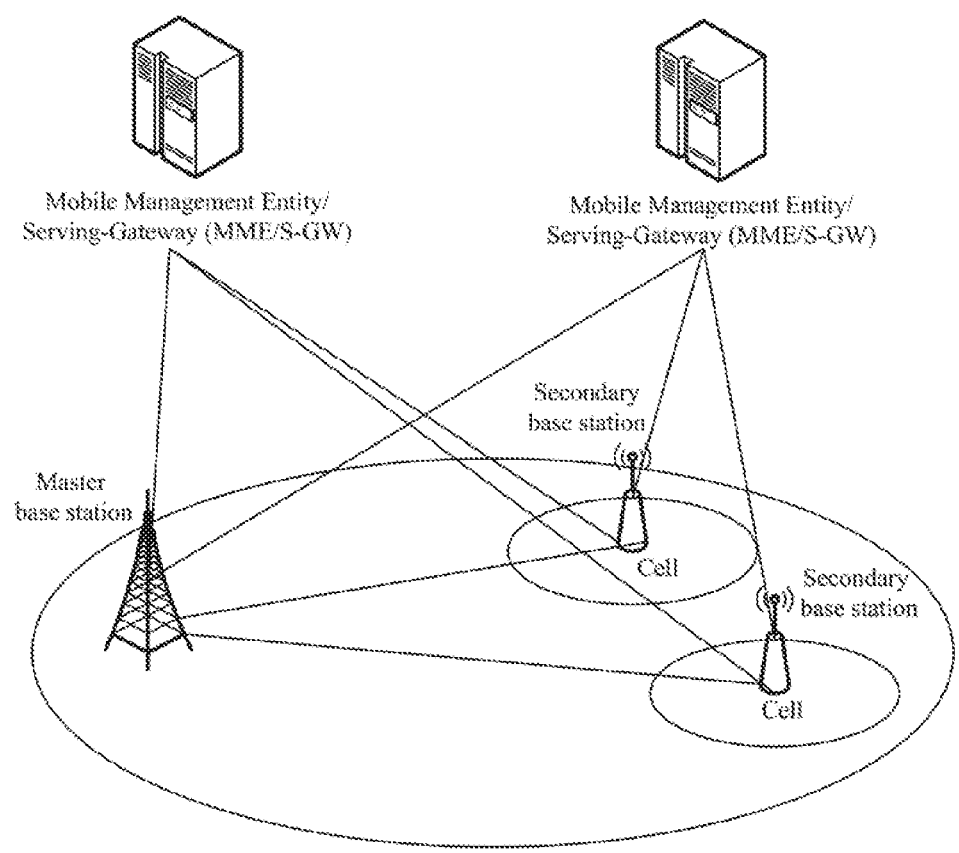
FIG. 1 is a schematic diagram of the network scenario where layered networks are deployed.
Figure 2:
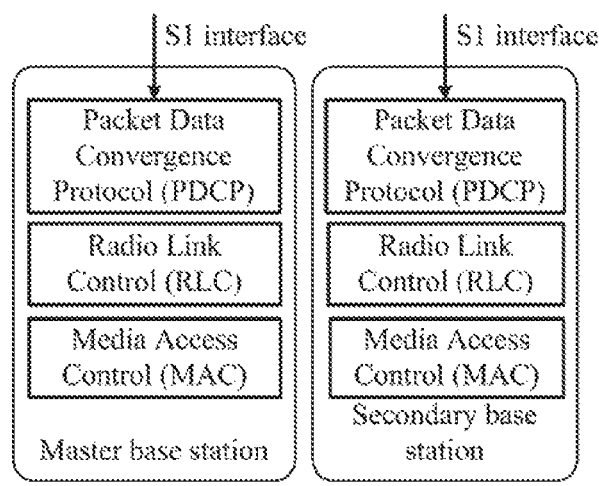
FIG. 2 is a schematic diagram of a first architecture of bearer splitting.
Figure 3:
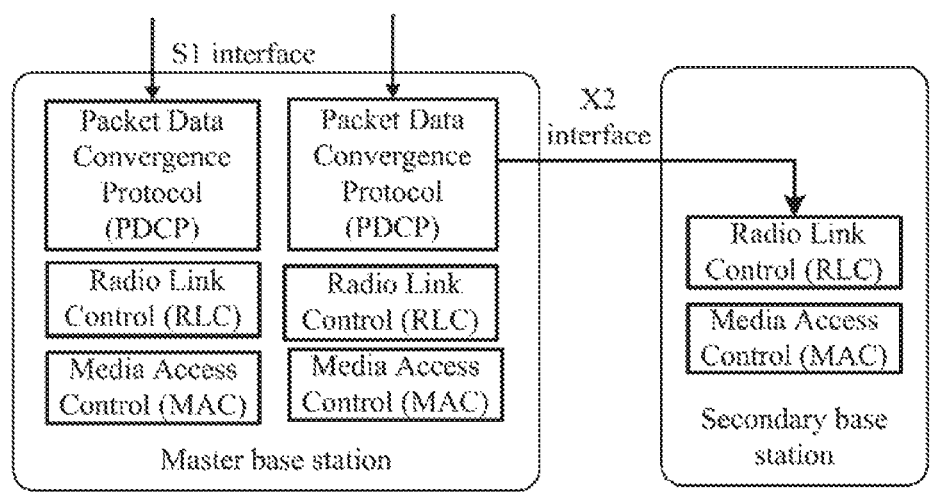
FIG. 3 is a schematic diagram of a third architecture of bearer splitting.

The architecture of bearer splitting can be supported in the network scenario of layered network deployment illustrated in FIG. 1. In the architecture of bearer splitting, a part of data bearers of a UE are maintained and managed on the master base station, and the other part of the data bearers are maintained and managed on the secondary base stations, where control plane bearers of the UE are maintained and managed by the cell of the master base station; and FIG. 2 and FIG. 3 are schematic diagrams of the first architecture of bearer splitting and the third architecture of bearer splitting respectively, where in the third architecture of bearer splitting, at the network side, a Packet Data Convergence Protocol (PDCP) entity corresponding to the UE resides on the master base station, there are Radio Link Control (RLC), MAC, and other entities corresponding to the same bearer, on the master base station and the secondary base stations, and the master base station transmits, by stream control technology, PDCP data to the RLC of the master base station, and the RLCs of the secondary base stations. The architecture at the UE side is a counterpart of the architecture at the network side. For a UE supporting this architecture of bearer splitting, if both uplink and downlink bearer splitting is supported, then both uplink and downlink data for the same bearer of the UE can be transmitted concurrently on the master base station and the secondary base stations; and if only downlink bearer splitting is supported, then downlink data for the same bearer of the UE can be transmitted concurrently on the master base station and the secondary base stations. In an area covered by both the master base station and a secondary base station in the architecture of bearer splitting, the UE supporting bearer splitting can operate while being served by both the master base station and the secondary base station so that the UE can be provided with a data service at a higher data transmission ratio and a lower cost over resources of the multiple aggregated base stations.

Figure 4:
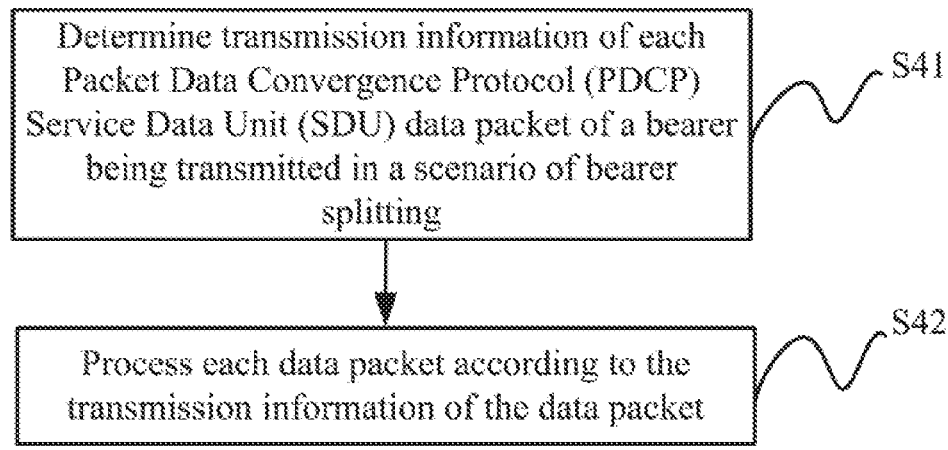
FIG. 4 is a schematic flow chart of a method for processing a data packet according to an embodiment of the application.

With the network scenario of layered network deployment, and the architecture of bearer splitting in FIG. 1 to FIG. 3, in a flow of processing a PDCP SDU data packet for a split bearer while the split bearer is operating normally, and when there is a change in secondary base stations serving the split bearer, an embodiment of the application provides a method for processing a data packet as illustrated in FIG. 4, where the method includes:

S41: determining transmission information of each Packet Data Convergence Protocol (PDCP) Service Data Unit (SDU) data packet of a bearer being transmitted in a scenario of bearer splitting; and S42: processing each data packet according to the transmission information of the data packet.

Preferably in the step S41, determining the transmission information of each Packet Data Convergence Protocol (PDCP) Service Data. Unit (SDU) data packet of the bearer being transmitted in the scenario of bearer splitting includes:

Receiving data packet transmission condition indication information of a PDCP Protocol Data Unit (PDU) transmitted by a Radio Link Control (RLC) entity, where the data packet transmission condition indication information includes the transmission information of each PDCP SDU data packet of the bearer being transmitted, where the transmission information of the data packet includes one or combination of information indicating a transmission failure of the data packet, information indicating a transmission success of the data packet, and information indicating that the data packet has not been transmitted; and Determining the transmission information of each PDCP SDU data packet of the bearer being transmitted, according to the data packet transmission condition indication information.

Preferably if there is an increase in the number of secondary base stations serving the bearer being transmitted on a master base station, then transmission of the PDCP SDU data packets of the bearer will be kept in the scenario of bearer splitting.

Preferably in the step S41, if there is a decrease in the number of secondary base stations serving the bearer in the scenario of bearer splitting, and/or some secondary base station is reconfigured, and/or some secondary base station is changed, then before the transmission information of each Packet Data Convergence Protocol (PDCP) Service Data Unit (SDU) data packet of the bearer being transmitted in the scenario of bearer splitting is determined, the method will further include:

Stopping the PDCP SDU data packets of the split bearer from being transmitted; and Keeping or stopping transmission of PDCP SDU data packets of other bearers.

Preferably in the step S41, if some secondary base station serving the bearer in the scenario of bearer splitting is changed, then receiving the data packet transmission condition indication information of the PDCP PDU transmitted by the RLC entity of a UE will include:

Receiving the data packet transmission condition indication information of the PDCP PDU, from a PDCP entity of the UE, forwarded by a changed target secondary base station serving the bearer.

Preferably in the step S41, if there is a decrease in the number of secondary base stations serving the bearer in the scenario of bearer splitting, and/or some secondary base station is reconfigured, and/or some secondary base station is changed, then determining the transmission information of each PDCP SDU data packet of the bearer being transmitted in the scenario of bearer splitting will include:

Receiving data packet transmission condition indication information of a PDCP Protocol Data Unit (PDU) transmitted by secondary base stations serving the bearer, where the data packet transmission condition indication information includes the transmission information of each PDCP SDU data packet of the bearer being transmitted, where the transmission information of the data packet includes one or combination of information indicating a transmission failure of the data packet, information indicating a transmission success of the data packet, and information indicating that the data packet has not been transmitted; and Determining the transmission information of each PDCP SDU data packet of the bearer being transmitted, according to the data packet transmission condition indication information.

Preferably after the data packet transmission condition indication information of the PDCP PDU transmitted by the secondary base stations serving the bearer is received, the method further includes:

Transmitting end indication information to the secondary base stations serving the bearer to indicate the last data packet among the PDCP SDU data packets.

Preferably in the step S41, determining the transmission information of each PDCP SDU data packet of the bearer being transmitted in the scenario of bearer splitting includes:

Determining the transmission information of each PDCP SDU data packet of the bearer being transmitted in the scenario of bearer splitting according to a data packet discard timer and/or the received data packet transmission condition indication information.

Preferably the data packet transmission condition indication information is in the form of an information stream, or in the form of data transmission acknowledgement state packets;

The data packet transmission condition indication information in the form of an information stream includes sequence numbers and transmission information of all the data packets including the first data packet which has failed to be transmitted or has not been transmitted, up to the lastly transmitted data packet, or the lastly transmitted data packet with an acknowledged transmission state among the PDCP SDU data packets of the bearer being transmitted, or sequence numbers and transmission information of all the data packets with acknowledged transmission states among the PDCP SDU data packets, and end indication information to indicate the last data packet in current transmission of the data packets; and The data packet transmission condition indication information in the form of data transmission acknowledgement state packets includes sequence numbers and transmission information of all the data packets including the first data packet which has failed to be transmitted or has not been transmitted, up to the lastly transmitted data packet, or the lastly transmitted data packet with an acknowledged transmission state among the PDCP SDU data packets of the bearer being transmitted;

Where the data packet with the acknowledged transmission state includes one or combination of a data packet which has not been transmitted, a data packet which has failed to be transmitted, and a data packet which has been transmitted successfully.

Preferably the transmission information of the data packet includes one or combination of information indicating a transmission failure of the data packet, information indicating a transmission success of the data packet, and information indicating that the data packet has not been transmitted; and In the step S42, processing each data packet according to the transmission information of the data packet includes:

Discarding a data packet which has been transmitted successfully among the PDCP SDU data packets being transmitted;

Retransmitting a data packet which has failed to be transmitted among the PDCP SDU data packets being transmitted; and Transmitting a data packet which has not been transmitted among the PDCP SDU data packets being transmitted.

Preferably if there is a decrease in the number of secondary base stations serving the bearer in the scenario of bearer splitting, and/or some secondary base station is reconfigured and/or some secondary base station is changed, then the method will further include:

Transmitting data packet transmission condition indication information of a PDCP Protocol Data Unit (PDU) to the peer entity for the peer entity to process the data packets, where the data packet transmission condition indication information includes the transmission information of each PDCP SDU data packet of the bearer being transmitted, where the transmission information of the data packet includes one or combination of information indicating a transmission failure of the data packet, information indicating a transmission success of the data packet, and information indicating that the data packet has not been transmitted.

A method for processing a data packet according to an embodiment will be described below in details with reference to the following particular embodiments thereof, for all of which reference is made to the network scenario of layered network deployment, and the architecture of bearer splitting in FIG. 1 to FIG. 3.

In a first embodiment, the process of PDCP SDU data packets, when PDCP SDU data packets of a split bearer are being transmitted normally, is discussed.

For the split bearer of a UE, aggregated base stations currently serving the split bearer include a master base station and secondary base stations, where, for example, the split bearer of the UE is transmitted concurrently on the master base station and the secondary base stations.

If the UE supports only downlink bearer splitting, then a PDCP entity in the master base station will allocate, a part of PDCP SDUs of the split bearer of the UE according to the stream control technology to an RLC entity in the master base station corresponding to the split bearer of the UE for transmission, and the other PDCP SDUs of the split bearer to RLC entities in the secondary base stations corresponding to the split bearer of the UE via an X2 interface for transmission.

The PDCP entity in the master base station determines transmission information of each PDCP SDU data packets of the split bearer being transmitted according to a data packet discard timer, and/or received data packet transmission condition indication information of a PDCP PDU transmitted by the RLC entities in the secondary base stations, and further processes the PDCP SDU data packets of the split bearer.

Particularly the PDCP entity starts a discard timer for a PDCP SDU of the split bearer upon reception of the PDCP SDU, and if the discard timer exceeds a preset length of time, then the PDCP entity will discard the PDCP SDU data packets of the split bearer corresponding to the discard timer, where a preset length of time of a discard timer configured for a PDCP SDU transmitted by a different RLC entity may be different. In the meantime, the RLC entities of the secondary base stations transmit the data packet transmission condition indication information of the PDCP PDU periodically or in real time to the PDCP entity located in the master base station, where the data packet transmission condition indication information includes the transmission information of each PDCP SDU data packets of the split bearer being transmitted, and the transmission information of the data packet includes information indicating a transmission failure of the data packet, or a transmission success of the data packet, or information indicating that the data packet has not been transmitted; and the PDCP entity acknowledges the transmission states of the current PDCP SDU packets, and processes the data packets which are currently transmitted, or which have been transmitted, upon reception of the data packet transmission condition indication information of the PDCP PDU. Particularly if the discard timer corresponding to the PDCP SDU does not exceed the preset length of time, then the PDCP entity will discard the data packets which have been transmitted successfully among the PDCP SDU data packets; or the PDCP entity will discard the data packets which have been transmitted successfully among the PDCP SDU data packets being transmitted, retransmit the data packets which have failed to be transmitted among the PDCP SDU data packets being transmitted, transmit the data packets which have not been transmitted among the PDCP SDU data packets being transmitted, and restart or start discard timers for the PDCP SDU data packets being retransmitted or transmitted, or keep their discard timers operating.

If the UE supports both uplink and downlink bearer splitting, then an operational flow at the network side will be the same as the operational flow at the network side if the UE supports only downlink bearer splitting in the first embodiment. At the UE side, a UE PDCP entity starts a discard timer for a PDCP SDU of the split bearer upon reception of the PDCP SDU, and if the discard timer exceeds a preset length of time, then the PDCP entity will discard the PDCP SDU data packets of the split bearer corresponding to the discard timer. A preset length of time of a discard timer configured for a PDCP SDU transmitted by a different RLC entity may be different. The UE PDCP entity determines transmission information of each PDCP SDU data packets of the split bearer being transmitted, according to the discard timer, and/or received data packet transmission condition indication information of a PDCP PDU transmitted by RLC entities in the secondary base stations, and further processes the PDCP SDU data packets of the split bearer. The UE RLC entities in the secondary base stations serving the split bearer notify periodically or in real time the UE PDCP entity of the data packet transmission condition indication information of the PDCP PDU so that the UE PDCP entity processes the PDCP PDU data packets according to the data packet transmission condition indication information of the PDCP PDU.

In a second embodiment, the process of PDCP SDU data packets, when there is an increase in the number of secondary base stations serving a split bearer, is discussed.

A master base station serving the split bearer transmits a message to an added secondary base station to indicate the increase in the number of secondary base stations, and configures a UE with resources of the added secondary base station via a Radio Resource Control (RRC) Reconfiguration message. The UE allocates the bearer resources of the added secondary base station according to the RRC Reconfiguration message, synchronizes with the added secondary base station, and also feeds a Reconfiguration Complete message back to the master base station.

With the increase in the number of secondary base stations serving the split bearer, transmission of the PDCP SDU data packets of the split bearer is kept like a normal bearer (the PDCP SDU data packets are transmitted particularly as described in the first embodiment), that is, transmission of the split bearer on the master base station will not be affected, operates like PDCP reordering and repeated discarding will not be triggered, and a receiver will not report any data packet transmission condition indication information of the PDCP PDU to the peer entity.

In the network side, after the master base station receives the Reconfiguration Complete message fed back by the UE, a PDCP entity located in the master base station transmits the PDCP SDU data packets, which have not been transmitted, to an RLC entity in the master base station and RLC entities in the secondary base stations according to the stream control technology, and a UE PDCP which is a receiver performs PDCP reordering of the split bearer on the PDCP SDU data packets of the master base station and the secondary base stations, and then submits them to a higher layer. In the UE side, after the UE adds the secondary base station, and notifies the network side, the PDCP entity in the UE transmits the data packets which have not been transmitted among the PDCP SDU data packets to the UE RLC entity in the master base station, and the UE RLC entities in the secondary base stations, according to the stream control technology, and the master base station PDCP which is a receiver performs PDCP reordering of the split bearer on the PDCP SDU data packets of the split bearer transmitted by the UE on the master base station and the secondary base stations, and then submits them to a higher layer.

In a third embodiment, the process of PDCP SDU data packets, when there is a decrease in the number of secondary base stations serving a split bearer, is discussed.

A master base station or a secondary base station serving the split bearer triggers a secondary base station deletion procedure in which the master base station instructs a UE via an RRC Reconfiguration message, including a split bearer identifier, a bearer specific resource, and other information, to delete the corresponding secondary base station. Dependent upon admission condition of the bearer by the master base station, the split hearer admitted by the master base station is subsequently transmitted separately by the master base station (i.e., bearer merging). The master base station handles the admitted split bearer by stopping the PDCP SDU data packets of the split hearer from being transmitted by the UE or the network side, preparing for reordering, and keeping or stopping transmission of PDCP SDU data packets of other bearers on the master base station, that is, the network side stops the PDCP SDU data packets of the split hearer from being transmitted in the downlink, and the network side starts to prepare for reordering when the master base station triggers a secondary base station deletion procedure or receives a secondary base station deletion request message; and the UE stops the PDCP SDU data packets of the split bearer from being transmitted in the uplink, and the UE starts to prepare for reordering upon reception of an RRC Reconfiguration message or after feeding back a Reconfiguration Complete message.

For downlink transmission of the data packets, after feeding back the Reconfiguration Complete message, the UE reports PDCP PDU data packet transmission condition indication information of the split bearer being transmitted, where the data packet transmission condition indication information includes transmission information of each PDCP SDU data packets of the split bearer being transmitted, and the transmission information of the data packet includes information indicating a transmission failure of the data packet, or a transmission success of the data packet, or information indicating that the data packet has not been transmitted; and a PDCP entity located in the master base station discards the data packets which have been transmitted successfully among the PDCP SDU data packets being transmitted, retransmits the data packets which have failed to be transmitted among the PDCP SDU data packets being transmitted, and transmits the data packets which have not been transmitted among the PDCP SDU data packets being transmitted, upon reception of the data packet transmission condition indication information.

Transmission of the other bearers, originally transmitted by the master base station, which have not been split will not be affected, but they will be transmitted normally (particularly as described in the first embodiment), or the other bearers which have not been split, on the master base station can be stopped from being transmitted, and PDCP PDU data packets of the other bearers which have not been split will be processed according to PDCP PDU data packet transmission condition indication information of the other bearers which have not been split, reported by the peer entity, particularly by discarding the data packets which have been transmitted successfully among the PDCP SDU data packets, retransmitting the data packets which have failed to be transmitted among the PDCP SDU data packets, and transmitting the data packets which have not been transmitted among the PDCP SDU data packets.

For uplink transmission of the data packets, if the network side triggers the secondary base station deletion procedure, then the master base station will transmit PDCP PDU data packet transmission condition indication information of the split bearer being transmitted, to the UE, and the UE will process the PDCP PDU data packets according to the PDCP PDU data packet transmission condition indication information, particularly by discarding the data packets which have been transmitted successfully among the PDCP SDU data packets, retransmitting the data packets which have failed to be transmitted among the PDCP SDU data packets, and transmitting the data packets which have not been transmitted among the PDCP SDU data packets.

In a fourth embodiment, the process of PDCP SDU data packets, when some secondary base station serving a split bearer is changed, is discussed.

A change in some secondary base station serving the split bearer refers to the original source secondary base station serving the split bearer being changed to a target secondary base station. After triggering a secondary base station change procedure, the master base station or the original secondary base station instructs the target secondary base station to admit the split bearer, after the target secondary base station admits the split bearer according to an admission algorithm, etc., the target second base station notifies the master base station of the identifier of the split bearer which can be admitted, and a corresponding dedicated/common resource configuration, and further the master base station notifies the UE via an RRC reconfiguration message. The UE or the network side stops the PDCP SDU data packets of the admitted split bearer from being transmitted, that is, the network side stops the PDCP SDU data packets of the split bearer from being transmitted in the downlink, and the network side starts to prepare for reordering when the master base station triggers a secondary base station deletion procedure or receives a secondary base station deletion request message; and the UE stops the PDCP SDU data packets of the split bearer from being transmitted in the uplink, and the UE starts to prepare for reordering upon reception of the RRC reconfiguration message or after feeding back a Reconfiguration Complete message.

For downlink transmission of the data packets, the UE reports PDCP PDU data packet transmission condition indication information of the split bearer being transmitted, to the target secondary base station after feeding back the Reconfiguration Complete message and synchronizing with the target secondary base station, where the data packet transmission condition indication information includes transmission information of each PDCP SDU data packets of the split bearer being transmitted, and the transmission information of the data packet includes information indicating a transmission failure of the data packet, or a transmission success of the data packet, or information indicating that the data packet has not been transmitted; and the target secondary base station transmits directly or processes and then transmits the PDCP PDU data packet transmission condition indication information to the master base station upon reception of the PDCP PDU data packet transmission condition indication information, and a PDCP entity located in the master base station discards the data packets which have been transmitted successfully among the PDCP SDU data packets being transmitted, retransmits the data packets which have failed to be transmitted among the PDCP SDU data packets being transmitted, and transmits the data packets which have not been transmitted among the PDCP SDU data packets being transmitted, upon reception of the data packet transmission condition indication information; or For downlink transmission of the data packets, the UE reports a transmission condition of the PDCP PDU data packets of the split bearer being transmitted, i.e., a PDCP state PDU corresponding to the PDCP PDU data packets, to the master base station after feeding back the Reconfigure Complete message, and a PDCP entity located in the master base station further determines transmission information of each data packet among the PDCP PDU data packets upon reception of the PDCP state PDU; and thereafter the PDCP entity located in the master base station discards the data packets which have been transmitted successfully among the PDCP SDU data packets being transmitted, retransmits the data packets which have failed to be transmitted among the PDCP SDU data packets being transmitted, and transmits the data packets which have not been transmitted among the PDCP SDU data packets being transmitted. The PDCP entity located in the master base station determines according to a stream control mechanism whether these PDCP SDU data packets to be retransmitted or transmitted are going to be transmitted by an RLC entity in the master base station, or an RLC entity in the target secondary base station, and notifies the corresponding RLC entity of a determination result.

For uplink transmission of the data packets, if the network side triggers a secondary base station deletion procedure, then the master base station will transmit the PDCP state PDU of the split bearer to the UE, and the UE will determine the transmission state of each PDCP SDU data packet according to the PDCP state PDU, and discard the PDCP SDU data packets which have been transmitted successfully, and retransmit or transmit the PDCP SDU data packets which have failed to be transmitted after the reconfiguration is completed.

Transmission of the other bearers, originally transmitted by the master base station which have not been split will not be affected, but they will be transmitted normally (particularly as described in the first embodiment), or the other bearers which have not been split, on the master base station can be stopped from being transmitted, and PDCP PDU data packets of the other bearers which have not been split will be processed according to PDCP PDU data packet transmission condition indication information of the other bearers which have not been split, reported by the peer entity, particularly by discarding the data packets which have been transmitted successfully among the PDCP SDU data packets, retransmitting the data packets which have failed to be transmitted among the PDCP SDU data packets, and transmitting the data packets which have not been transmitted among the PDCP SDU data packets.

For uplink transmission of the data packets, if the network side triggers the secondary base station change procedure, then the master base station will transmit PDCP PDU data packet transmission condition indication information of the split bearer being transmitted, to the UE, and the UE will process the PDCP PDU data packets according to the PDCP PDU data packet transmission condition indication information, particularly by discarding the data packets which have been transmitted successfully among the PDCP SDU data packets, retransmitting the data packets which have failed to be transmitted among the PDCP SDU data packets, and transmitting the data packets which have not been transmitted among the PDCP SDU data packets.

In a fifth embodiment, the process of PDCP SDU data packets, when reconfiguring secondary base stations serving a split bearer, is discussed.

During reconfiguration of secondary base station serving a split bearer is being reconfigured, if the split bearer is reconfigured from the secondary base station onto the master base station, that is, the split bearer is merged, then transmission of the other bearers on the secondary base station and the master base station will not be affected. The UE or the network side stops the PDCP SDU data packets of the split bearer from being transmitted, that is, the network side stops the PDCP SDU data packets of the split bearer from being transmitted in the downlink, and the network side starts to prepare for reordering when the master base station triggers a secondary base station reconfiguration procedure or receives a secondary base station reconfiguration request message; and the UE stops the PDCP SDU data packets of the split bearer from being transmitted in the uplink, and the UE starts to prepare for reordering upon reception of the RRC reconfiguration message or after feeding back a Reconfiguration Complete message.

For downlink transmission of the data packets, the UE reports PDCP PDU data packet transmission condition indication information of the split bearer being transmitted, to the reconfigured secondary base station after feeding back the Reconfiguration Complete message and synchronizing with the reconfigured secondary base station, where the data packet transmission condition indication information includes transmission information of each PDCP SDU data packets of the split bearer being transmitted, and the transmission information of the data packet includes information indicating a transmission failure of the data packet, or a transmission success of the data packet, or information indicating that the data packet has not been transmitted; and the target secondary base station transmits directly or processes and then transmits the PDCP PDU data packet transmission condition indication information to the master base station upon reception of the PDCP PDU data packet transmission condition indication information; or the UE reports the PDCP PDU data packet transmission condition indication information of the split bearer directly to the master base station. A PDCP entity located in the master base station discards the data packets which have been transmitted successfully among the PDCP SDU data packets being transmitted, retransmits the data packets which have failed to be transmitted among the PDCP SDU data packets being transmitted, and transmits the data packets which have not been transmitted among the PDCP SDU data packets being transmitted, upon reception of the data packet transmission condition indication information; and Transmission of the other bearers, originally transmitted by the master base station, which have not been split will not be affected, but they will be transmitted normally (particularly as described in the first embodiment), or the other bearers which have not been split, on the master base station can be stopped from being transmitted, and PDCP PDU data packets of the other bearers which have not been split will be processed according to PDCP PDU data packet transmission condition indication information of the other bearers which have not been split, reported by the peer entity, particularly by discarding the data packets which have been transmitted successfully among the PDCP SDU data packets, retransmitting the data packets which have failed to be transmitted among the PDCP SDU data packets, and transmitting the data packets which have not been transmitted among the PDCP SDU data packets.

For uplink transmission of the data packets, if the network side triggers the secondary base station reconfiguration procedure, then the master base station will transmit PDCP PDU data packet transmission condition indication information of the split bearer being transmitted, to the UE, and the UE will process the PDCP PDU data packets according to the PDCP PDU data packet transmission condition indication information, particularly by discarding the data packets which have been transmitted successfully among the PDCP SDU data packets, retransmitting the data packets which have failed to be transmitted among the PDCP SDU data packets, and transmitting the data packets which have not been transmitted among the PDCP SDU data packets.

In a sixth embodiment, the process of PDCP SDU data packets, when some secondary base station serving a split bearer is deleted/reconfigured/changed, is discussed.

For downlink transmission of the data packets, the master base station transmits a secondary base station deletion/reconfiguration/change request message to the original secondary base station by transmitting end indication information to the original secondary base station to indicate the last data packet among the PDCP SDU data packets so as to notify an RLC entity in the original secondary base station of identification information of the PDCP SDU data packet lastly transferred to the original secondary base station for transmission, and that there will be no more PDCP SDU data packet from the master base station to be transmitted by the original secondary base station. The RLC entity in the original secondary base station transmits PDCP PDU data packet transmission condition indication information of the split bearer to the master base station according to a acknowledged transmission condition of PDCP SDU data packets, and the end indication information, where the data packet transmission condition indication information includes transmission information of each PDCP SDU data packets of the split bearer being transmitted, and the transmission information of the data packet includes information indicating a transmission failure of the data packet, or a transmission success of the data packet, or information indicating that the data packet has not been transmitted; and the target secondary base station transmits the PDCP PDU data packet transmission condition indication information to the master base station upon reception of the PDCP PDU data packet transmission condition indication information, and a PDCP entity located in the master base station discards the data packets which have been transmitted successfully among the PDCP SDU data packets being transmitted, retransmits the data packets which have failed to be transmitted among the PDCP SDU data packets being transmitted, and transmits the data packets which have not been transmitted among the PDCP SDU data packets being transmitted, upon reception of the data packet transmission condition indication information. The master base station transmitting to the original secondary base station further needs to transmit end indication information to the original secondary base station to indicate the last data packet among the PDCP SDU data packets.

For uplink transmission of the data packets, a PDCP entity in the UE transmits end indication information to an RLC entity corresponding to the secondary base station in the UE to indicate the last data packet among the PDCP SDU data packets, and the RLC entity corresponding to the secondary base station in the UE transmits PDCP PDU data packet transmission condition indication information of the split bearer to the PDCP entity corresponding to the master base station in the UE according to an acknowledged transmission condition of PDCP SDU data packets, and the end indication information, and further the PDCP entity processes the PDCP PDU data packets, that is, discards the data packets which have been transmitted successfully among the PDCP SDU data packets, retransmits the data packets which have failed to be transmitted among the PDCP SDU data packets, and transmits the data packets which have not been transmitted among the PDCP SDU data packets.

In the first embodiment to the sixth embodiment above, the PDCP entity located in the master base station needs to transmit the data packet transmission condition indication information of the PDCP PDU to the peer entity for the peer entity to process the data packets, where the data packet transmission condition indication information includes the transmission information of each PDCP SDU data packet or part of PDCP SDU data packets of the bearer being transmitted, where the transmission information of the data packet can be information indicating a transmission failure of the data packet, information indicating a transmission success of the data packet, and information indicating that the data packet has not been transmitted. If the data packet transmission condition indication information includes the transmission information of a part or all of the data packets among the PDCP SDU data packets of the bearer being transmitted, then it needs to grantee that the receiver can determine or conclude the transmission information of each data packet according to the data packet transmission condition indication information.

In the first embodiment to the sixth embodiment above, the data packet transmission condition indication information received by the PDCP entity can be in the form of an information stream, or in the form of data transmission acknowledgement state packets;

The data packet transmission condition indication information in the form of an information stream includes sequence numbers and transmission information of all the data packets including the first data packet which has failed to be transmitted or has not been transmitted, up to the lastly transmitted data packet among the PDCP SDU data packets of the bearer being transmitted, and end indication information to indicate the last data packet in current transmission of the data packets; or Sequence numbers and transmission information of all the data packets including the first data packet which has failed to be transmitted, or which has not been transmitted, up to the lastly transmitted data packet with an acknowledged transmission state among the PDCP SDU data packets of the bearer being transmitted, and end indication information to indicate the last data packet in current transmission of the data packets; or Sequence numbers and transmission information of all the data packets with acknowledged transmission states among the PDCP SDU data packets, and end indication information to indicate the last data packet in current transmission of the data packets; and The data packet transmission condition indication information in the form of data transmission acknowledgement state packets includes sequence numbers and transmission information of all the data packets including the first data packet which has failed to be transmitted or has not been transmitted, up to the lastly transmitted data packet among the PDCP SDU data packets of the bearer being transmitted; or Sequence numbers and transmission information of all the data packets including the first data packet which has failed to be transmitted, or which has not been transmitted, up to the lastly transmitted data packet with an acknowledged transmission state among the PDCP SDU data packets of the bearer being transmitted;

Where the data packet with the acknowledged transmission state can include a data packet which has been transmitted successfully, or a data packet which has failed to be transmitted, or the data packet with the acknowledged transmission state can alternatively include a data packet which has not been transmitted.

Figure 5:
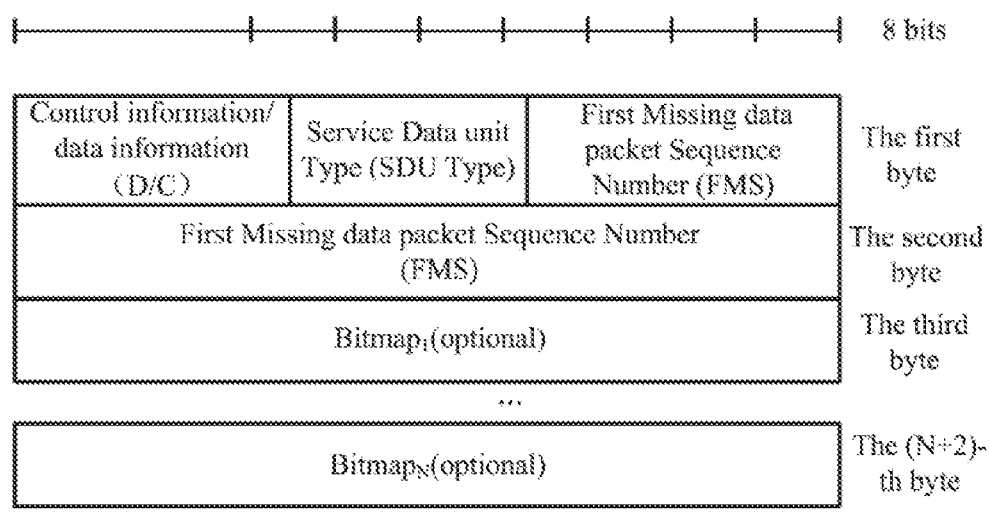
FIG. 5 is a schematic structural diagram of a data transmission acknowledgement state packet according to an embodiment of the application.

An embodiment of the application provides a schematic structural diagram of a data transmission acknowledgement state packet, and as illustrated in FIG. 5, the control information/data information D/C indicates whether the split bearer carries control information or data information, where this is set to C for a data transmission acknowledgement state packet; the Service Data Unit (SDU) Type of 010 indicates that this SDU is a data transmission acknowledged state SDU; the First Missing PDCP data packet Sequence Number (SFN) (FMS) indicates the sequence number of the first data packet which has failed to be transmitted, or which has not been transmitted among the PDCP SDU data packets of the split bearer; and if at least one PDCP SDU/PDCP PDU which has failed to be transmitted is stored in the RLC entity, then a bitmap filed will be added to indicate the number of sequence numbers of all the data packets from the sequence number of the first data packet which has failed to be transmitted, or which has not been transmitted, up to the sequence number of the last data packet which has failed to be transmitted, or which has not been transmitted, and if the number of bits in the bitmap field is not an integer multiple of 8, then the bitmap field will be supplemented so that the number of bits therein is an integer multiple of 8; and all the bits in the bitmap field corresponding to the PDCP SDU/PDCP PDU data packets which have failed to be transmitted are set to "0", and all the bits in the bitmap field corresponding to the PDCP SDU/PDCP PDU data packets which have been transmitted successfully are set to "1".

The data packet transmission condition indication information transmitted from the PDCP data packet receiver entity to the transmitter (i.e., the peer entity) entity can also be in the form of a PDCP state PDU.

Figure 6:
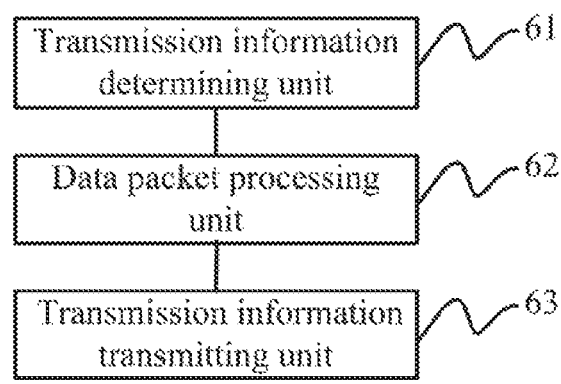
FIG. 6 is a schematic structural diagram of an apparatus for processing a data packet according to an embodiment of the application.

In correspondence to the method above, as illustrated in FIG. 6, an embodiment of the application provides an apparatus for processing a data packet, where the apparatus includes:

A transmission information determining unit 61 is configured to determine transmission information of each Packet Data Convergence Protocol (PDCP) Service Data Unit (SDU) data packet of a bearer being transmitted in a scenario of bearer splitting; and A data packet processing unit 62 is configured to process each data packet according to the transmission information of that data packet.

Preferably the transmission information determining unit 61 is configured:

To receive data packet transmission condition indication information of a PDCP Protocol Data Unit (PDU) transmitted by a Radio Link Control (RLC) entity, where the data packet transmission condition indication information includes the transmission information of each PDCP SDU data packet of the bearer being transmitted, where the transmission information of the data packet includes one or combination of information indicating a transmission failure of the data packet, information indicating a transmission success of the data packet, and information indicating that the data packet has not been transmitted; and To determine the transmission information of each PDCP SDU data packet of the bearer being transmitted, according to the data packet transmission condition indication information.

Preferably if there is an increase in the number of secondary base stations serving the bearer being transmitted on a master base station, then transmission of the PDCP SDU data packets of the bearer will be kept in the scenario of bearer splitting.

Preferably if there is a decrease in the number of secondary base stations serving the bearer in the scenario of bearer splitting, and/or some secondary base station is reconfigured, and/or some secondary base station is changed, then the transmission information determining unit 61 will be further configured:

To stop the PDCP SDU data packets of the split bearer from being transmitted; and To keep or stop transmission of PDCP SDU data packets of other bearers.

Preferably if some secondary base station serving the bearer in the scenario of bearer splitting is changed, then the transmission information determining unit 61 will be further configured:

To receive the data packet transmission condition indication information of the PDCP PDU, transmitted by a PDCP entity from a UE, forwarded by a target secondary base station serving the bearer after a change of secondary base station.

Preferably if there is a decrease in the number of secondary base stations serving the bearer in the scenario of bearer splitting, and/or some secondary base station is reconfigured, and/or some secondary base station is changed, then the transmission information determining unit 61 will be further configured:

To receive data packet transmission condition indication information of a PDCP Protocol Data Unit (PDU) transmitted by secondary base stations serving the bearer, where the data packet transmission condition indication information includes the transmission information of each PDCP SDU data packet of the bearer being transmitted, where the transmission information of the data packet includes one or combination of information indicating a transmission failure of the data packet, information indicating a transmission success of the data packet, and information indicating that the data packet has not been transmitted; and To determine the transmission information of each PDCP SDU data packet of the bearer being transmitted, according to the data packet transmission condition indication information.

Preferably the transmission information determining unit 61 is further configured, after the data packet transmission condition indication information of the PDCP PDU transmitted by the secondary base stations serving the bearer is received:

To transmit end indication information to the secondary base stations serving the bearer to indicate the last data packet among the PDCP SDU data packets.

Preferably the transmission information determining unit 61 is further configured:

To determine the transmission information of each PDCP SDU data packet of the bearer being transmitted in the scenario of bearer splitting according to a data packet discard timer and/or the received data packet transmission condition indication information.

Preferably the data packet transmission condition indication information is in the form of an information stream, or in the form of data transmission acknowledgement state packets;

The data packet transmission condition indication information in the form of an information stream includes sequence numbers and transmission information of all the data packets including the first data packet which has failed to be transmitted or has not been transmitted, up to the lastly transmitted data packet, or the lastly transmitted data packet with an acknowledged transmission state among the PDCP SDU data packets of the bearer being transmitted, or sequence numbers and transmission information of all the data packets with acknowledged transmission states among the PDCP SDU data packets, and end indication information to indicate the last data packet in current transmission of the data packets; and The data packet transmission condition indication information in the form of data transmission acknowledgement state packets includes sequence numbers and transmission information of all the data packets including the first data packet which has failed to be transmitted or has not been transmitted, up to the lastly transmitted data packet, or the lastly transmitted data packet with an acknowledged transmission state among the PDCP SDU data packets of the bearer being transmitted;

Where the data packet with the acknowledged transmission state includes one or combination of a data packet which has not been transmitted, a data packet which has failed to be transmitted, and a data packet which has been transmitted successfully.

Preferably the transmission information of the data packet includes one or combination of information indicating a transmission failure of the data packet, information indicating a transmission success of the data packet, and information indicating that the data packet has not been transmitted; and The data packet processing unit 62 is configured:

To discard a data packet which has been transmitted successfully among the PDCP SDU data packets being transmitted;

To retransmit a data packet which has failed to be transmitted among the PDCP SDU data packets being transmitted; and To transmit a data packet which has not been transmitted among the PDCP SDU data packets being transmitted.

Preferably if there is a decrease in the number of secondary base stations serving the bearer in the scenario of bearer splitting, and/or some secondary base station is reconfigured, and/or some secondary base station is changed, then the apparatus will further include:

A transmission information transmitting unit 63 is configured to transmit data packet transmission condition indication information of a PDCP Protocol Data. Unit (PDU) to a peer entity for the peer entity to process the data packets, where the data packet transmission condition indication information includes the transmission information of each PDCP SDU data packet of the bearer being transmitted, where the transmission information of the data packet includes one or combination of information indicating a transmission failure of the data packet, information indicating a transmission success of the data packet, and information indicating that the data packet has not been transmitted.

Particularly the transmission information determining unit 61 can be embodied as a processor, and a transmitting module capable of transmitting and receiving, the data packet processing unit 62 can be embodied as a processor or another entity, and the transmission information transmitting unit 63 can be embodied as a transmitting module capable of transmitting and receiving, for example, the transmitting module can be a dedicated chip and an antenna, etc., although these units in the application will not be limited to these entities.

Figure 7:
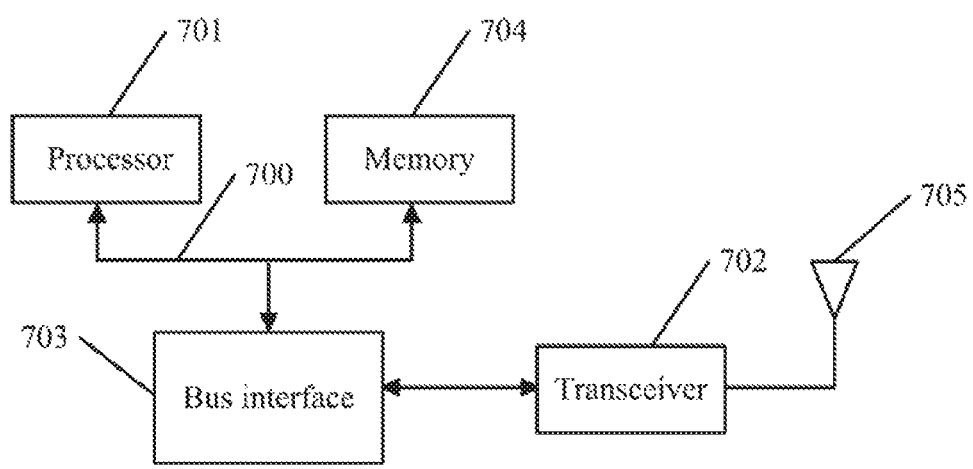
FIG. 7 is a schematic structural diagram of another apparatus for processing a data packet according to an embodiment of the application.

As illustrated in FIG. 7, an embodiment of the application provides another apparatus for processing a data packet, where the apparatus includes:

A processor 701 is configured to read program in a memory 704, and to perform the process of:

Determining transmission information of each Packet Data Convergence Protocol (PDCP) Service Data Unit (SDU) data packet of a bearer being transmitted in a scenario of bearer splitting; and processing each data packet according to the transmission information of the data packet; and A transceiver 702 is configured to be controlled by the processor 701 to transmit and receive data.

Preferably the processor 701 is configured:

To receive data packet transmission condition indication information of a PDCP Protocol Data Unit (PDU) transmitted by a Radio Link Control (RLC) entity, where the data packet transmission condition indication information includes the transmission information of each PDCP SDU data packet of the bearer being transmitted, where the transmission information of the data packet includes one or combination of information indicating a transmission failure of the data packet, information indicating a transmission success of the data packet, and information indicating that the data packet has not been transmitted; and to determine the transmission information of each PDCP SDU data packet of the bearer being transmitted, according to the data packet transmission condition indication information.

Preferably if there is an increase in the number of secondary base stations serving the bearer being transmitted on a master base station, then transmission of the PDCP SDU data packets of the bearer will be kept in the scenario of bearer splitting.

Preferably if there is a decrease in the number of secondary base stations serving the bearer in the scenario of bearer splitting, and/or some secondary base station is reconfigured, and/or some secondary base station is changed, then the processor 701 will be further configured:

To stop the PDCP SDU data packets of the split bearer from being transmitted; and To keep or stop transmission of PDCP SDU data packets of other bearers.

Preferably if some secondary base station serving the bearer in the scenario of bearer splitting is changed, then the processor 701 will be further configured:

To receive the data packet transmission condition indication information of the PDCP PDU, transmitted by a PDCP entity from a UE, forwarded by a target secondary base station serving the bearer after a change of secondary base station.

Preferably if there is a decrease in the number of secondary base stations serving the bearer in the scenario of bearer splitting, and/or some secondary base station is reconfigured, and/or some secondary base station is changed, then the processor 701 will be further configured:

To receive data packet transmission condition indication information of a PDCP Protocol Data Unit (PDU) transmitted by secondary base stations serving the bearer, where the data packet transmission condition indication information includes the transmission information of each PDCP SDU data packet of the bearer being transmitted, where the transmission information of the data packet includes one or combination of information indicating a transmission failure of the data packet, information indicating a transmission success of the data packet, and information indicating that the data packet has not been transmitted; and To determine the transmission information of each PDCP SDU data packet of the bearer being transmitted, according to the data packet transmission condition indication information.

Preferably the processor 701 is further configured, after the data packet transmission condition indication information of the PDCP PDU transmitted by the secondary base stations serving the bearer is received:

To transmit end indication information to the secondary base stations serving the bearer to indicate the last data packet among the PDCP SDU data packets.

Preferably the processor 701 is further configured:

To determine the transmission information of each PDCP SDU data packet of the bearer being transmitted in the scenario of bearer splitting according to a data packet discard timer and/or the received data packet transmission condition indication information.

Preferably the data packet transmission condition indication information is in the form of an information stream, or in the form of data transmission acknowledgement state packets;

The data packet transmission condition indication information in the form of an information stream includes sequence numbers and transmission information of all the data packets including the first data packet which has failed to be transmitted or has not been transmitted, up to the lastly transmitted data packet, or the lastly transmitted data packet with an acknowledged transmission state among the PDCP SDU data packets of the bearer being transmitted, or sequence numbers and transmission information of all the data packets with acknowledged transmission states among the PDCP SDU data packets, and end indication information to indicate the last data packet in current transmission of the data packets; and The data packet transmission condition indication information in the form of data transmission acknowledgement state packets includes sequence numbers and transmission information of all the data packets including the first data packet which has failed to be transmitted or has not been transmitted, up to the lastly transmitted data packet, or the lastly transmitted data packet with an acknowledged transmission state among the PDCP SDU data packets of the bearer being transmitted;

Where the data packet with the acknowledged transmission state includes one or combination of a data packet which has not been transmitted, a data packet which has failed to be transmitted, and a data packet which has been transmitted successfully.

Preferably the transmission information of the data packet includes one or combination of information indicating a transmission failure of the data packet, information indicating a transmission success of the data packet, and information indicating that the data packet has not been transmitted; and The processor 701 is configured:

To discard a data packet which has been transmitted successfully among the PDCP SDU data packets being transmitted;

To retransmit a data packet which has failed to be transmitted among the PDCP SDU data packets being transmitted; and To transmit a data packet which has not been transmitted among the PDCP SDU data packets being transmitted.

Preferably if there is a decrease in the number of secondary base stations serving the bearer in the scenario of bearer splitting, and/or some secondary base station is reconfigured, and/or some secondary base station is changed, then the apparatus further includes:

processor 701 configured to transmit data packet transmission condition indication information of a PDCP Protocol Data Unit (PDU) to a peer entity for the peer entity to process the data packets, where the data packet transmission condition indication information includes the transmission information of each PDCP SDU data packet of the bearer being transmitted, where the transmission information of the data packet includes one or combination of information indicating a transmission failure of the data packet, information indicating a transmission success of the data packet, and information indicating that the data packet has not been transmitted.

In FIG. 7, there is a bus architecture (represented as a bus 700), and the bus 700 can include any number of interconnected buses and bridges. The bus 700 links together various circuits including one or more processors represented by the processor 701, and one or more memories represented by the memory 704. The bus 700 can further link together various other circuits, e.g., peripheral devices, a voltage stabilizer, a power management circuit, etc., and all of these circuits are well known in the art, so a further description thereof will be omitted in this context. The bus interface 703 serves as an interface between the bus 700 and the transceiver 702. The transceiver 702 can include one or more elements, including the number of transmitters and receivers, serving as elements configured to communicate with various other devices over a transmission medium. Data processed by the processor 701 are transmitted by the antenna 705 over a wireless medium, and furthermore the antenna 705 further receives and transmits data to the processor 701.

The processor 701 is responsible for managing the bus 700 and performing other normal processes, and can further perform various functions including timing, a peripheral interface, voltage regulation, power source management, and other control functions, and the memory 704 can be configured to store data for use by the processor 701 in operation.

Optionally the processor 701 can include a CPU, an ASIC, an FPGA, or a CPLD.

Those skilled in the art shall appreciate that the embodiments of the application can be embodied as a method, a system or a computer program product. Therefore the application can be embodied in the form of an all-hardware embodiment, an all-software embodiment or an embodiment of software and hardware in combination. Furthermore the application can be embodied in the form of a computer program product embodied in one or more computer useable storage mediums (including but not limited to a disk memory, an optical memory, etc.) in which computer useable program codes are contained.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the application without departing from the spirit and scope of the application. Thus the application is also intended to encompass these modifications and variations thereto so long as the modifications and variations come into the scope of the claims appended to the application and their equivalents.

The invention claimed is:

1. A method for processing a data packet, the method comprising:
   determining transmission information of each Packet Data Convergence Protocol, PDCP, Service Data Unit, SDU, data packet of a bearer being transmitted in a scenario of bearer splitting; and
   processing each data packet according to the transmission information of that data packet;
   wherein the transmission information of the data packet comprises one or combination of information indicating a transmission failure of the data packet, information indicating a transmission success of the data packet, and information indicating that the data packet has not been transmitted; and
   processing each data packet according to the transmission information of that data packet comprises:
   discarding a data packet which has been transmitted successfully among the PDCP SDU data packets being transmitted;
   retransmitting a data packet which has failed to be transmitted among the PDCP SDU data packets being transmitted; and
   transmitting a data packet which has not been transmitted among the PDCP SDU data packets being transmitted.

2. The method according to claim 1, wherein determining the transmission information of each PDCP SDU data packet of the bearer being transmitted in the scenario of bearer splitting comprises:
   receiving data packet transmission condition indication information of a PDCP Protocol Data Unit, PDU, transmitted by a Radio Link Control, RLC, entity, wherein the data packet transmission condition indication information comprises the transmission information of each PDCP SDU data packet of the bearer being transmitted, wherein the transmission information of the data packet comprises one or combination of information indicating a transmission failure of the data packet, information indicating a transmission success of the data packet, and information indicating that the data packet has not been transmitted; and
   determining the transmission information of each PDCP SDU data packet of the bearer being transmitted, according to the data packet transmission condition indication information.

3. The method according to claim 2, wherein if there is a decrease in the number of secondary base station serving the bearer in the scenario of bearer splitting, and/or reconfiguration of the secondary base station serving the bearer in the scenario of bearer splitting, and/or a change of the secondary base station serving the bearer in the scenario of bearer splitting, then before the transmission information of each PDCP SDU data packet of the bearer being transmitted in the scenario of bearer splitting is determined, the method further comprises:
   stopping the PDCP SDU data packets of the split bearer from being transmitted; and
   keeping or stopping transmission of PDCP SDU data packets of other bearers.

4. The method according to claim 3, wherein if a secondary base station serving the bearer in the scenario of bearer splitting is changed, then receiving the data packet transmission condition indication information of the PDCP PDU transmitted by the RLC entity of a LIE comprises:
   receiving the data packet transmission condition indication information of the PDCP PDU, transmitted by a PDCP entity from a UE, forwarded by a changed target secondary base station serving the bearer.

5. The method according to claim 1, wherein if there is an increase in the number of secondary base stations serving bearers being transmitted on a master base station, then transmission of the PDCP SDU data packets of the bearer being transmitted in the scenario of bearer splitting will be kept in the scenario of bearer splitting.

6. The method according to claim 1, wherein if there is a decrease in the number of secondary base station serving the bearer in the scenario of bearer splitting, and/or reconfiguration of the secondary base station serving the bearer in the scenario of bearer splitting, and/or a change of the secondary base station serving the bearer in the scenario of bearer splitting, then determining the transmission information of each PDCP SDU data packet of the bearer being transmitted in the scenario of bearer splitting comprises:
   receiving data packet transmission condition indication information of a PDCP Protocol Data Unit, PDU, transmitted by the secondary base station serving the bearer in the scenario of bearer splitting, wherein the data packet transmission condition indication information comprises the transmission information of each PDCP SDU data packet of the bearer being transmitted, wherein the transmission information of the data packet comprises one or combination of information indicating a transmission failure of the data packet, information indicating a transmission success of the data packet, and information indicating that the data packet has not been transmitted; and
   determining the transmission information of each PDCP SDU data packet of the bearer being transmitted, according to the data packet transmission condition indication information.

7. The method according to claim 6, wherein after the data packet transmission condition indication information of the PDCP PDU transmitted by the secondary base station serving the bearer in the scenario of bearer splitting is received, the method further comprises:
   transmitting end indication information to a secondary base station serving the bearer in the scenario of bearer splitting to indicate a last data packet among the PDCP SDU data packets.

8. The method according to claim 6, wherein determining the transmission information of each PDCP SDU data packet of the bearer being transmitted in the scenario of bearer splitting comprises:
   determining the transmission information of each PDCP SDU data packet of the bearer being transmitted in the scenario of bearer splitting according to a data packet discard timer and/or the received data packet transmission condition indication information.

9. The method according to claim 8, wherein the data packet transmission condition indication information is in a form of an information stream, or in a form of data transmission acknowledgement state packets;

the data packet transmission condition indication information in the form of an information stream comprises sequence numbers and transmission information of all data packets comprising a first data packet which has failed to be transmitted or has not been transmitted, up to a lastly transmitted data packet, or a lastly transmitted data packet with an acknowledged transmission state among the PDCP SDU data packets of the bearer being transmitted, or sequence numbers and transmission information of all data packets with acknowledged transmission states among the PDCP SDU data packets, and end indication information to indicate a last data packet in current transmission of the data packets;

the data packet transmission condition indication information in the form of data transmission acknowledgement state packets comprises sequence numbers and transmission information of all the data packets comprising the first data packet which has failed to be transmitted or has not been transmitted, up to the lastly transmitted data packet, or the lastly transmitted data packet with an acknowledged transmission state among the PDCP SDU data packets of the bearer being transmitted;

wherein the data packet with the acknowledged transmission state comprises one or combination of a data packet which has not been transmitted, a data packet which has failed to be transmitted, and a data packet which has been transmitted successfully.

10. An apparatus for processing a data packet, the apparatus comprising:

a processor;

a memory storing instructions, wherein the processor is configured to execute the instructions to:

determine transmission information of each Packet Data Convergence Protocol, PDCP, Service Data Unit, SDU, data packet of a bearer being transmitted in a scenario of bearer splitting; and process each data packet according to the transmission info ion of that data packet;

wherein the transmission information of the data packet comprises one or combination of information indicating a transmission failure of the data packet, information indicating a transmission success of the data packet, and information indicating that the data packet has not been transmitted; and the processor is further configured to execute the instructions to:

discard a data packet which has been transmitted successfully among the PDCP SDU data packets being transmitted;

retransmit a data packet which has failed to be transmitted among the PDCP SDU data packets being transmitted; and transmit a data packet which has not been transmitted among the PDCP SDU data packets being transmitted.

11. The apparatus according to claim 10, further comprising a receiver, wherein the processor is further configured to execute the instructions to:

control the receiver to receive data packet transmission condition indication information of a PDCP Protocol Data Unit, PDU, transmitted by a Radio Link Control, RLC, entity, wherein the data packet transmission condition indication information comprises the transmission information of each PDCP SDU data packet of the bearer being transmitted, wherein the transmission information of the data packet comprises one or combination of information indicating a transmission failure of the data packet, information indicating a transmission success of the data packet, and information indicating that the data packet has not been transmitted; and determine the transmission information of each PDCP SDU data packet of the bearer being transmitted, according to the data packet transmission condition indication information.

12. The apparatus according to claim 11, wherein if there is a decrease in the number of secondary base station serving the bearer in the scenario of bearer splitting, and/or reconfiguration of the secondary base station serving the bearer in the scenario of bearer splitting, and/or a change of the secondary base station serving the bearer in the scenario of bearer splitting, then before the transmission information of each PDCP SDU data packet of the bearer being transmitted in the scenario of bearer splitting is determined, the processor is further configured to execute the instructions to:

stop the PDCP SDU data packets of the split bearer from being transmitted; and keep or stop transmission of PDCP SDU data packets of other bearers.

13. The apparatus according to claim 12, wherein if a secondary base station serving the bearer in the scenario of bearer splitting is changed, then the processor is further configured to execute the instructions to:

control the receiver to receive the data packet transmission condition indication information of the PDCP PDU, transmitted by a PDCP entity from a UE, forwarded by a changed target secondary base station serving the bearer.

14. The apparatus according to claim 10, wherein if there is an increase in the number of secondary base stations serving bearers being transmitted on a master base station, then transmission of the PDCP SDU data packets of the bearer being transmitted in the scenario of bearer splitting will be kept in the scenario of bearer splitting.

15. The apparatus according to claim 10, further comprising a receiver, wherein if there is a decrease in the number of secondary base station serving the bearer in the scenario of bearer splitting, and/or reconfiguration of the secondary base station serving the bearer in the scenario of bearer splitting, and/or a change of the secondary base station serving the bearer in the scenario of bearer splitting, then the processor is further configured to execute the instructions to:

control the receiver to receive data packet transmission condition indication information of a PDCP Protocol Data Unit, PDU, transmitted by the secondary base station serving the bearer in the scenario of bearer splitting, wherein the data packet transmission condition indication information comprises the transmission information of each PDCP SDU data packet of the bearer being transmitted, wherein the transmission information of the data packet comprises one or combination of information indicating a transmission failure of the data packet, information indicating a transmission success of the data packet, and information indicating that the data packet has not been transmitted; and determine the transmission information of each PDCP SDU data packet of the bearer being transmitted, according to the data packet transmission condition indication information.

16. The apparatus according to claim 15, further comprising a transmitter, wherein after the data packet transmission condition indication information of the PDCP PDU transmitted by the secondary base stations serving the bearer in the scenario of bearer splitting is received, the processor is further configured to execute the instructions to:
control the transmitter to transmit end indication information to a secondary base station serving the bearer in the scenario of bearer splitting to indicate a last data packet among the PDCP SDU data packets.

17. The apparatus according to claim 15, wherein the processor is further configured to execute the instructions to:
determine the transmission information of each PDCP SDU data packet of the bearer being transmitted in the scenario of bearer splitting according to a data packet discard timer and/or the received data packet transmission condition indication information.

18. The apparatus according to claim 17, wherein the data packet transmission condition indication information is in a form of an information stream, or in a form of data transmission acknowledgement state packets;
the data packet transmission condition indication information in the form of an information stream comprises sequence numbers and transmission information of all data packets comprising a first data packet which has failed to be transmitted or has not been transmitted, up to a lastly transmitted data packet, or a lastly transmitted data packet with an acknowledged transmission state among the PDCP SDU data packets of the bearer being transmitted, or sequence numbers and transmission information of all data packets with acknowledged transmission states among the PDCP SDU data packets, and end indication information to indicate a last data packet in current transmission of the data packets;
the data packet transmission condition indication information in the form of data transmission acknowledgement state packets comprises sequence numbers and transmission information of all the data packets comprising the first data packet which has failed to be transmitted or has not been transmitted, up to the lastly transmitted data packet, or the lastly transmitted data packet with an acknowledged transmission state among the PDCP SDU data packets of the bearer being transmitted;
wherein the data packet with the acknowledged transmission state comprises one or combination of a data packet which has not been transmitted, a data packet which has failed to be transmitted, and a data packet which has been transmitted successfully.

* * * * *